No. 764,435. PATENTED JULY 5, 1904.
J. G. DONALDSON & J. H. McGARIGLE.
BEET CLEANING APPARATUS.
APPLICATION FILED MAR. 1, 1904.
NO MODEL. 3 SHEETS—SHEET 1.
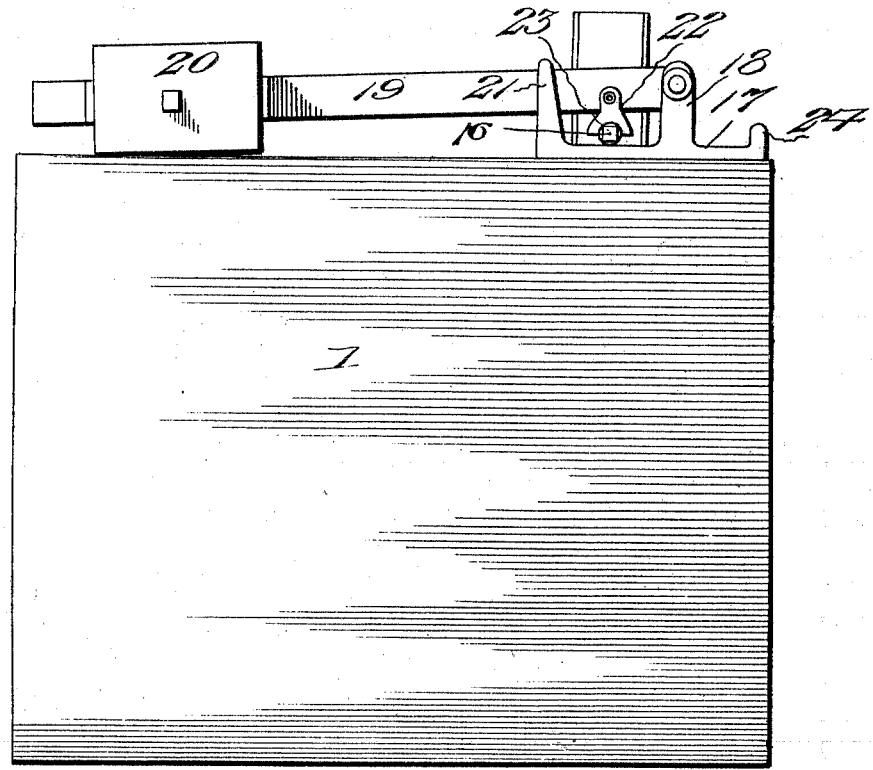
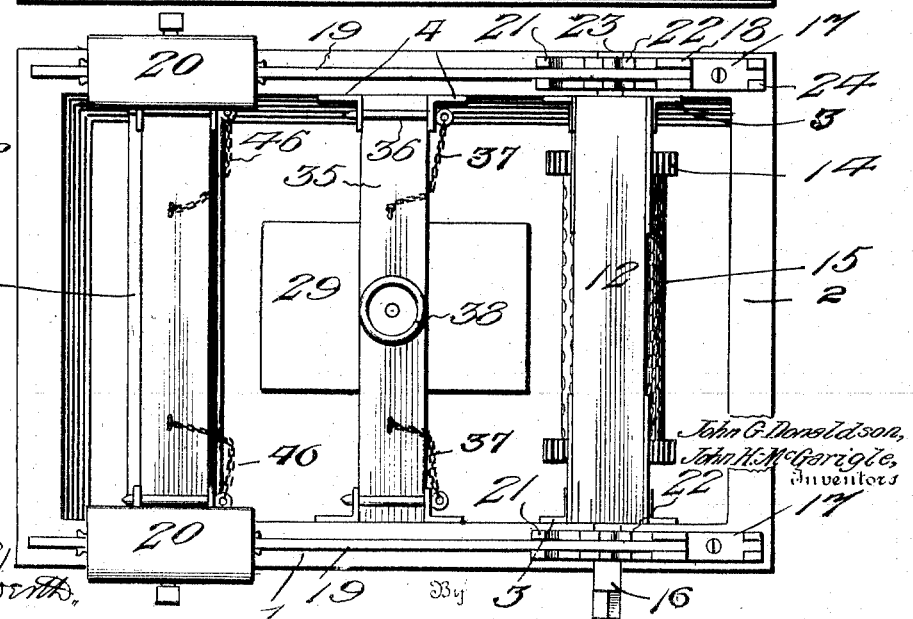

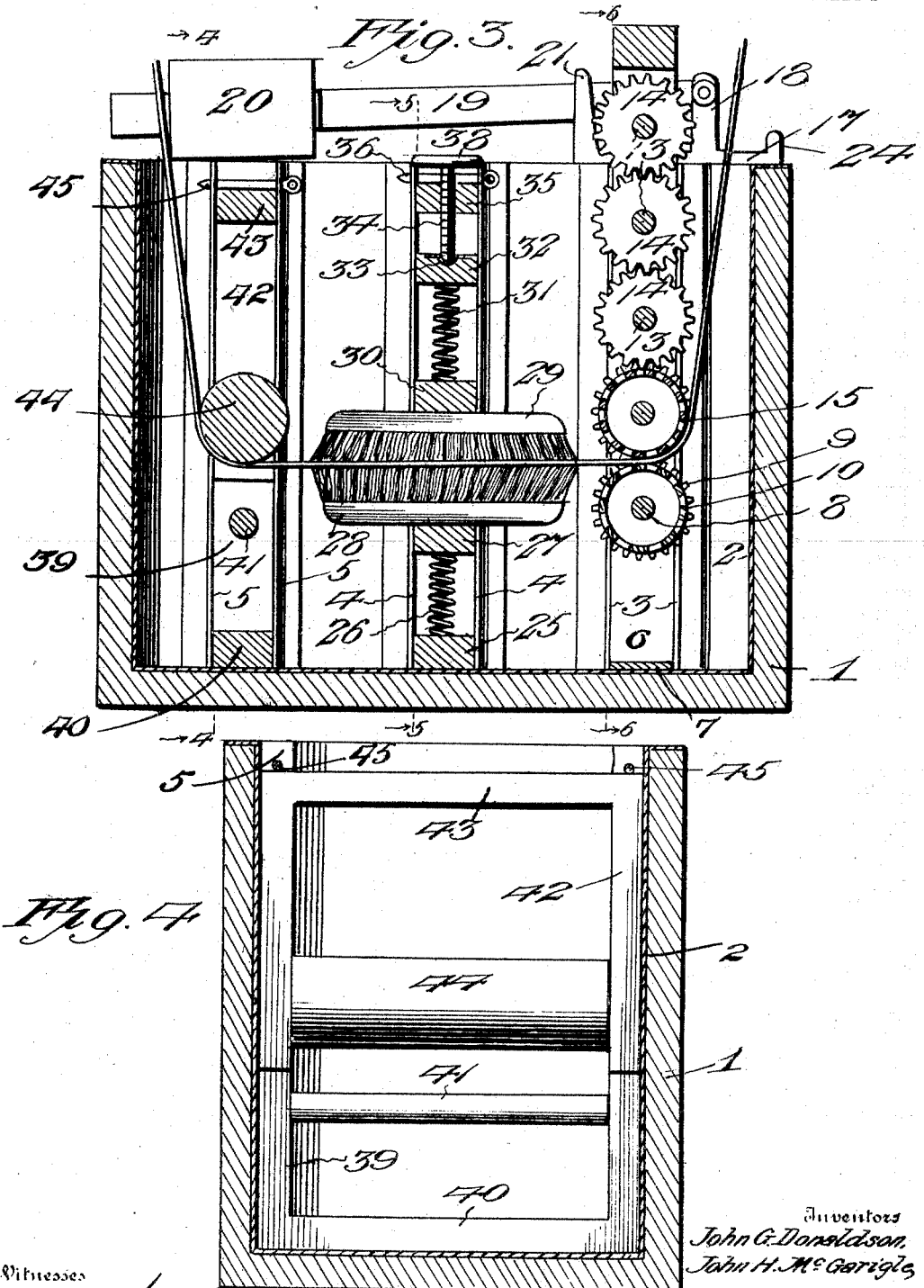

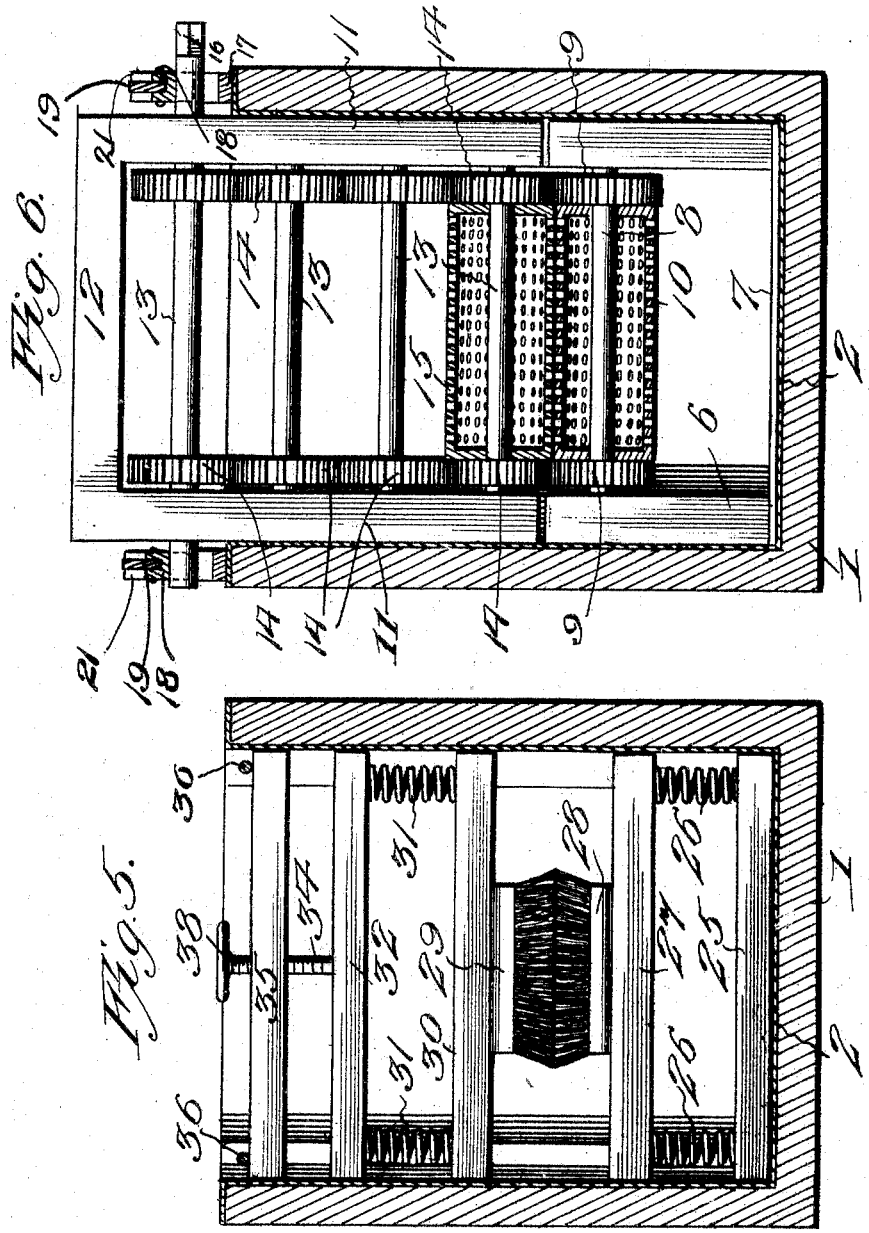

No. 764,435. Patented July 5, 1904.

UNITED STATES PATENT OFFICE.

JOHN GEORGE DONALDSON AND JOHN HENRY McGARIGLE, OF PORTLAND, MAINE; SAID McGARIGLE ASSIGNOR TO SAID DONALDSON.

BELT-CLEANING APPARATUS.

SPECIFICATION forming part of Letters Patent No. 764,435, dated July 5, 1904.

Application filed March 1, 1904. Serial No. 195,965. (No model.)

*To all whom it may concern:*

Be it known that we, JOHN GEORGE DONALDSON and JOHN HENRY McGARIGLE, citizens of the United States, residing at Portland, in the county of Cumberland and State of Maine, have invented new and useful Improvements in Belt-Cleaning Apparatus, of which the following is a specification.

Our invention relates to new and useful improvements in machines for renovating belts; and its object is to provide a simple and compact apparatus into which an endless belt is adapted to be placed and which will extract all dirt and oil from the belt and deliver it absolutely clean.

Another object is to provide means whereby the belt is subjected successively to a compressing, scrubbing, and washing process.

Another object is to provide means for regulating the tension of the compressing and scrubbing devices upon the belt.

With the above and other objects in view the invention consists of a tank having guides in the sides thereof in each of which are mounted two frames—to wit, a lower frame and an upper frame. One of the lower frames has a perforated roller journaled therein and extending across the tank. Another of the lower frames has a spring-supported scrubbing-brush therein, while the third frame is provided with a cross-bar. The upper frames in the guides are adapted to rest by gravity upon the lower frames, and one of them has a perforated compressing-roller and a train of gears for transmitting rotary motion thereto, while the other frames are provided with a spring-pressed scrubbing-brush and a roller, respectively. Means are provided for regulating the pressure of the rollers and brushes upon each other.

The invention also consists in the further novel construction and combination of parts hereinafter more fully described and claimed, and illustrated in the accompanying drawings, showing the preferred form of our invention, and in which—

Figure 1 is a side elevation of the apparatus. Fig. 2 is a top plan view thereof. Fig. 3 is a central longitudinal section therethrough. Fig. 4 is a section on line 4 4, Fig. 3. Fig. 5 is a section on line 5 5, Fig. 3, and showing the brushes in elevation; and Fig. 6 is a section on line 6 6, Fig. 3, showing the rollers in section.

Referring to the figures by numerals of reference, 1 is a tank, formed of any suitable material and preferably lined with metal, as shown at 2, so as to render the same proof against the escape of naphtha or similar liquid adapted to be placed within the tank. Arranged upon the inner face of each side of the tank are parallel guide-cleats arranged in pairs numbered 3, 4, and 5, respectively, and seated between the cleats 3 is a frame comprising standards 6, connected at their lower ends by a cross-strip 7 and having a shaft 8 journaled in the upper portions thereof and provided with gears 9 at points adjacent its ends. Secured to this shaft between the gears 9 is a perforated roller 10. A second frame formed of standards 11 and a cross-bar 12 is located between the cleats 3 and above the standards 6, and this second frame has a series of vertically-alining shafts 13 therein, each of which is provided with gears 14 adjacent its ends. All of these gears mesh, and when the standards 11 are in position on the standards 6 the lower gears 14 mesh with and are adapted to rotate the gears 9. Secured to the lower shaft 13 and between its gears 14 is a perforated roller 15, which is similar to the roller 10 and is adapted to normally bear thereupon. The upper shaft 13 projects through the standards 11 and over the upper edges of the side walls of the tank, and one of these ends is angular, as shown at 16, so as to permit the attachment thereto of a crank, wheel, or any other suitable means for transmitting rotary motion thereto. Base-plates 17 are secured upon the side wall at points under the ends of the upper shaft 13, and each of these base-plates has a standard 18, in which is pivoted one end of a lever 19. This lever has an adjustable weight 20 thereon and is normally located within a forked arm 21, which projects upward from the base-plate. Pivoted to the lever is a block 22, having a recess 23 in its lower end, which is adapted to bear upon the adjoining portion of the upper shaft 13, and it will thus be seen that when the two levers 20 are in position within the forked arms 21 a downward pressure will be exerted thereby upon the shaft 13 and all the shafts thereunder, and therefore the two rollers 10 and 15 will be promptly clamped together. A supporting-bracket 24 is arranged at the outer end of each of the plates 17 for holding the levers 19 when the same are swung out of operative position.

Arranged upon the bottom of the tank and between the cleats 4 is a cross-strip 25, having coiled springs 26 extending upward from the ends thereof and secured to the ends of a cross-strip 27 and supporting the same. Connected to this last-mentioned cross-strip is an inverted brush 28, the upper or working face of which is normally approximately in horizontal alinement with the pass between rollers 10 and 15. Arranged above the brush 28 is a second similar oppositely-disposed brush 29, which is connected to a cross-strip 30, slidably mounted between the cleats 4 and secured to the lower ends of coiled springs 31. These springs are fastened at their upper ends to the ends of a cross-strip 32, which is also slidably mounted between the cleats 4 and has a socket 33 in the center of its upper face for the reception of a compressing-screw 34. This screw projects through and engages a cross-strip 35, which is arranged between the upper ends of the cleats 4 and is adapted to be held in position therebetween by pins 36, which extend through the cleats and above the cross-bar 35. These pins are preferably secured to said cross-bar by means of chains 37. A head 38 is arranged upon the upper end of the screw 34, so as to permit it to be readily rotated.

Standards 39 are mounted between the cleats 5, at the lower ends thereof, and are connected by a base-strip 40 and by a cross-rod 41, said rod being located adjacent the upper ends of standards 39. Side strips 42 are slidably mounted between the cleats 5 above standards 39 and are connected at the top by a cross-strip 43. A roller 44 is journaled between the lower portions of the side strips 42, and the lower face of this roller is adapted to approximately aline with the working faces of the brushes 28 and 29 and the pass between the rollers 10 and 15. Cross-pins 45 are arranged within the upper ends of cleats 5 and above the cross-strip 43 and serve to prevent the displacement of the said cross-strip and the parts connected thereto. Chains 46 connect these pins with the cross-strip 43.

In using the machine herein described the levers 19 are swung backward upon the brackets 24 and pins 36 and 45 are withdrawn. The standard 11 and the parts connected thereto, the cross-strips 30, 32, and 35, together with brush 29, and the side strips 42, with the roller 44, are then drawn upward from their respective cleats and the tank is filled with naphtha or other suitable liquid. The belt to be cleaned is then suspended from a pulley or other suitable support and with the lower portion thereof within the tank and upon the roller 10, the brush 28, and the rod 41. The parts which were removed from the tank are then replaced, and the roller 15 and the trains of gears for transmitting motion thereto are locked in place by means of the levers 19, which are swung over the upper shaft 13 and serve to hold the same. The brush 29 is held in place by the pins 36 and the roller 34 by the pins 35. The pressure of the brushes 28 and 29 upon the opposite faces of the belt is regulated by means of the screw 34. After the parts have been placed in the positions described motion is transmitted to the rollers 10 and 15 by rotating the upper shaft 13, which in turn transmits motion to said rollers through the gears 14. As the rollers are perforated and bear upon opposite faces of the belt with great pressure, it will be understood that all oil, &c., contained within the belt will be pressed therefrom and into the rollers, and when the belt leaves the pass between the rollers and expands it will absorb a portion of the naphtha contained within the tank. As the rollers rotate they will force the belt longitudinally within the tank, and the same will pass between the scrubbing-brushes 28 and 29, which will remove any dirt which may have accumulated upon the face of the belt. The belt will then pass under roller 24 and out of the tank, after which the naphtha contained within the belt will evaporate, and said belt will thus be thoroughly cleansed and in condition for use. It will be seen that all of the parts of the apparatus can be readily removed and replaced.

In the foregoing description we have shown the preferred form of our invention, but we do not limit ourselves thereto, as we are aware that modifications may be made therein without departing from the spirit or sacrificing any of the advantages thereof, and we therefore reserve the right to make such changes as fairly fall within the scope of our invention.

Having thus described the invention, what is claimed as new is—

1. In an apparatus of the character described, the combination with a tank having guide-cleats therein; of a stationary perforated roller detachably mounted between the cleats, a movable perforated roller bearing thereupon, means for transmitting rotary motion to the rollers, weighted levers for pressing the rollers together, spring-pressed oppositely-arranged scrubbing-brushes detachably mounted between the cleats, means for tensioning the springs of the brushes, a roller detachably mounted between the cleats, and means for locking the brushes and roller within the tank.

2. In an apparatus of the character described, the combination with a tank having guide-cleats therein; of a stationary roller detachably mounted between the cleats, a movable roller bearing thereupon, said rollers adapted to be normally submerged, mechanism for transmitting rotary motion to the rollers, means for pressing the rollers together, oppositely-arranged spring-pressed brushes detachably mounted between the cleats, and adapted to be normally submerged, means for tensioning the springs of the brushes, and means for locking the brushes and rollers within the tank.

In testimony whereof we affix our signatures in presence of two witnesses.

JOHN GEORGE DONALDSON.
JOHN HENRY McGARIGLE.

Witnesses:
MARTIN J. FOLEY,
JOSEPH H. BURKE.